(12) United States Patent
Fomitchev et al.

(10) Patent No.: US 11,091,631 B2
(45) Date of Patent: Aug. 17, 2021

(54) NANOCOMPOSITES CONTAINING CRYSTALLINE POLYESTER AND ORGANOSILICA

(71) Applicant: Cabot Corporation, Boston, MA (US)

(72) Inventors: Dmitry Fomitchev, Lexington, MA (US); Hairuo Tu, Boxborough, MA (US); Paul S. Palumbo, West Newton, MA (US); Samir Kumar, Lexington, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 16/346,252

(22) PCT Filed: Nov. 2, 2017

(86) PCT No.: PCT/US2017/059638
§ 371 (c)(1),
(2) Date: Apr. 30, 2019

(87) PCT Pub. No.: WO2018/085483
PCT Pub. Date: May 11, 2018

(65) Prior Publication Data
US 2020/0048456 A1 Feb. 13, 2020

Related U.S. Application Data

(60) Provisional application No. 62/417,496, filed on Nov. 4, 2016.

(51) Int. Cl.
*G03G 9/113* (2006.01)
*C08L 67/02* (2006.01)
(Continued)

(52) U.S. Cl.
CPC ............... *C08L 67/02* (2013.01); *B01J 13/14* (2013.01); *B01J 13/203* (2013.01); *C08L 75/06* (2013.01);
(Continued)

(58) Field of Classification Search
CPC ...... C08L 67/02; C08L 75/06; C08L 2207/53; C08L 2205/03; C08L 2205/025; G03G 9/1133; G03G 9/1131; G03G 9/09725; G03G 9/09371; G03G 9/09342; G03G 9/09321; G03G 9/09307; G03G 9/09733;
(Continued)

(56) References Cited

U.S. PATENT DOCUMENTS

2008/0233509 A1 9/2008 Keoshkerian et al.
2013/0323637 A1 12/2013 Watanabe et al.
(Continued)

OTHER PUBLICATIONS

International Search Report and Written Opinion of the International Searching Authority, or the Declaration of International Application No. PCT/US2017/059638 dated Feb. 28, 2018.

*Primary Examiner* — Peter L Vajda

(57) ABSTRACT

The invention provides a process for preparing core-shell composite particles comprising a polyester, polymerized ethylenically unsaturated silane compounds, and optionally a hydrophobic surface treatment. The invention further provides a composite particle comprising a polyester and a radically polymerized ethylenically unsaturated silane compound.

10 Claims, 3 Drawing Sheets

(51) Int. Cl.
*B01J 13/14* (2006.01)
*B01J 13/20* (2006.01)
*C08L 75/06* (2006.01)
*C09D 5/03* (2006.01)
*C09D 11/30* (2014.01)

(52) U.S. Cl.
CPC ............... *C09D 5/03* (2013.01); *C09D 11/30* (2013.01); *G03G 9/1131* (2013.01); *G03G 9/1133* (2013.01); *C08L 2205/025* (2013.01); *C08L 2205/03* (2013.01); *C08L 2207/53* (2013.01)

(58) Field of Classification Search
CPC .......... C09D 11/30; C09D 5/03; B01J 13/203; B01J 13/14
See application file for complete search history.

(56) References Cited

U.S. PATENT DOCUMENTS

2015/0099222 A1    4/2015  Terui et al.
2016/0184427 A1    7/2016  Kim et al.
2018/0329323 A1*  11/2018  Kimura ................ G03G 9/0825

* cited by examiner

NANOCOMPOSITES CONTAINING CRYSTALLINE POLYESTER AND ORGANOSILICA

BACKGROUND OF THE INVENTION

Electrophotographic image formation comprises uniform charging of the surface of a photoreceptor drum or belt; exposure of the photoreceptor surface to light and formation on the photoreceptor surface of a charge pattern, i.e., a latent image, that mirrors the information to be transferred into a real image; developing the latent image with electrostatically charged toner particles comprising a colorant dispersed in a binder resin; transferring the developed toner onto a substrate, e.g. paper; fusing the image onto a substrate; and preparing the photoreceptor surface for the next cycle by erasing the residual electrostatic charges and cleaning the remaining toner particles.

Toners for use in electrophotography and electrostatic printing include a binder resin and a colorant, and may further include a charge control agent, an offset-preventing agent, and other additives. External toner additives such as metal oxide particles are often combined with toner particles in order to improve selected properties of the toner particles, including fluidity, transferability, fixability, and cleaning properties. A variety of external additives may be used in a single toner composition to enhance different properties of the toner. For example, some additives may be selected to improve chargeability, i.e., tribocharge. Others may be selected to improve cleaning performance or humidity resistance. Of course, it is preferable that a toner additive optimized for one function is not detrimental to the functions imparted by the various additives.

One function imparted by the toner additives is spacing and maintenance of flowability. If the toner particles adhere to one another, they will not flow as well; additives serve to reduce the cohesion of the toner powder. The additive particles tend to be hard. The toner, in contrast, is formed from softer polymers and is a coherent powder. The resulting agglomeration of toner particles is detrimental to both the operation of the electrophotography apparatus and to the print quality. Indeed, as manufacturers have sought to reduce the energy required to produce a printed page, they have turned to softer polymers (i.e., lower Tg polymers) to reduce the amount of heat required to fuse the toner to a substrate. However, the hard additive particles can become embedded in the soft toner particles, reducing the effectiveness of the additive. Increasing the size of the additive particle reduces embedding; however, the larger particles are also heavier and exhibit a higher rate of drop-off from the toner particle. Of course, additive particles that drop off the toner cannot serve their function as part of the toner composition. Thus, it is desirable to have a toner additive that serves as a spacer between toner particles that both exhibits limited embedding in the toner particles and limited drop-off without adverse impact on the tribocharge characteristics of the toner.

Furthermore, it is desired that the toner additive not interfere with the printing process. Once the toner is deposited on the paper or other substrate, it is fused with heat to attach the toner particles to themselves and the paper. To reduce energy consumption during printing, it is desired to have toner particles that fuse at lower temperatures. If the additive interferes with fusing, the toner particles may not fully coalesce during fusing, resulting in the development of voids between the printed toner and the paper. Such voids reduce the durability of the printed image. One solution is the development of additives that protect the toner as it is transferred from toner developer to the paper or other substrate but that exhibit a lower melting point or glass transition temperature when subjected to the fusing event, such that they become more malleable or even melt and induce melting during the fusing process. However, in addition to promoting low temperature fusing or fixation of the toner, it is also necessary for the toner to be exhibit stability at high storage temperatures. Thus, it is desirable to develop a toner additive that performs the traditional functions of stabilizing tribocharge, preventing embedding of additives, and facilitating free flow of toner even after extended storage while exhibiting desired thermal/physical properties, for example, those required for fusing.

In addition, toner additives desirably will possess sufficient mechanical strength to maintain their structural integrity when subjected to mechanical stresses associated with manufacturing and with toner development. Toner additives will additionally maintain integrity upon heating during toner development and resist formation of a film on printing equipment.

BRIEF SUMMARY OF THE INVENTION

In one embodiment, a process for preparing core-shell composite particles comprises (i) providing a solution comprising one or more polyesters and up to 10 parts by mass per part of the total amount of polyester of a first ethylenically unsaturated silane compound having alkoxysilane groups in an organic solvent; (ii) adding sufficient base to the solution provided in step (i) to deprotonate acid groups on the polyester in solution; (iii) adding water to the solution obtained in step (ii) to form an emulsion; (iv) distilling at least a portion of the solvent and the base from the emulsion to bring the emulsion to a pH of from 5 to 7; (v) adding up to 30 parts by mass per part of the total amount of polyester of a second ethylenically unsaturated silane compound having alkoxysilane groups to the emulsion; (vi) radically polymerizing the ethylenically unsaturated silane compound to provide a dispersion of core-shell particles; and (vii) cross-linking the polymerized ethylenically unsaturated silane compound by hydrolyzing and condensing at least a portion of the alkoxysilane groups. The core shell composite particles are produced with at least 0.1 total parts of ethylenically unsaturated silane compound having alkoxysilane groups per part total amount of polyester.

The process may further comprise surface-treating the core shell particles with a hydrophobizing agent, for example, a silane, a siloxane, a silazane, or a combination of two or more of these. The hydrophobizing agent may comprise a silane and/or a silazane and cross-linking and hydrophobizing may be performed simultaneously. The first and second ethylenically unsaturated silane compounds have the same composition.

The polyester may comprise at least one crystalline polyester, at least one amorphous polyester, or a mixture of a crystalline and an amorphous polyester. The crystalline polyester may have a weight average molecular weight of about 10,000 to about 100,000 and/or an acid number of from about 1 mg KOH/to about 30 mg KOH/g. The amorphous polyester may have a weight average molecular weight of about 10,000 to about 50,000 and/or an acid number of from about 5 mg KOH/to about 50 mg KOH/g.

A portion of alkoxysilane groups of the first ethylenically unsaturated silane compound may be hydrolyzed before radically polymerizing. The process may further comprise adding a vinyl monomer, an acrylic monomer, or an alkoxysilane to the emulsion in step (v). The solution of step (i)

may comprise two crystalline polyesters. The emulsion may be an oil-in-water emulsion. At least a portion of a core of the composite particle has a melting point of up to about 200° C., for example, from 25 to 150° C.

The process may further comprise isolating the core-shell particles, washing the core-shell particles with solvent, and/or drying the core-shell particles to provide a dry powder of core-shell particles.

The first and second ethylenically unsaturated silane compounds may independently have a structure $R^4SiR'_m(OR'')_n$, wherein $R^4$ is either C2-C4 alkenyl or $R^3C(CH_2)(CO)OR^2-$, $R^3$ is either H or C1-C6 alkyl, $R^2$ is C3-C22 alkylene, and R' and R'' are independently C1-C6 alkyl, m is an integer of 0-2, and n is an integer of 1-3, wherein m+n=3. For example, either or both of the first and second ethylenically unsaturated silane compounds may be (trimethoxysilyl)propyl methacrylate. Polymerizing the ethylenically unsaturated silane compound may comprise adding a free radical polymerization initiator to the emulsion.

In another embodiment, a composite particle is produced by the process described above. A toner composition may comprise toner particles and the composite particles.

In another embodiment, a composite particle comprises a core comprising an amorphous polyester, a crystalline polyester, or a mixture of an amorphous polyester and a crystalline polyester and a shell comprising a polymer or copolymer of an ethylenically unsaturated silane compound. Fewer than 25 mol %, for example fewer than 20%, fewer than 15%, more preferably fewer than 10%, most preferably fewer than 5% of the carbon in the shell is part of an ethylenically unsaturated group. A proportion of T0 and T1 groups in the composite particle as a fraction of total T groups may be from 5 to 20% as measured by $^{29}Si$ DPMAS NMR spectroscopy.

The crystalline polyester may have a weight average molecular weight of about 10,000 to about 100,000 and/or an acid number of from about 1 mg KOH/to about 30 mg KOH/g. The amorphous polyester may have a weight average molecular weight of about 10,000 to about 50,000 and/or an acid number of from about 5 mg KOH/to about 50 mg KOH/g.

The ethylenically unsaturated silane compound may comprise a structure $R^4SiR'_m(OR'')_n$, wherein $R^4$ is either C2-C4 alkenyl or $R^3C(CH_2)(CO)OR^2-$, $R^3$ is either H or C1-C6 alkyl, $R^2$ is C3-C22 alkylene, and R' and R'' are independently C1-C6 alkyl, m is an integer of 0-2, and n is an integer of 1-3, wherein m+n=3. The ethylenically unsaturated silane compound may comprise (trimethoxysilyl)propyl methacrylate.

The surface of the composite particle may have been reacted with a hydrophobizing agent, for example, a silane, a silazane, a siloxane, or a combination thereof. The composite particle may have a volume-median-diameter (d50) of about 20 nm to about 1000 nm. A mass ratio of polyester: ethylenically unsaturated silane compound may be from 1:0.1 to 1:40. At least a portion of the core of the composite particle may have a melting point up to 200° C., for example from 25 to 150° C.

The composite particle may be used with toner particles in a toner composition. Alternatively, the composite particle may be used in an inkjet ink. The composite particle may be part of a recording medium, for example, in a coating of a recording medium. The composite particles may be included in a powder preparation for selective laser sintering along with a polymer.

In another embodiment, a method of preparing an encapsulated chemical species, comprises removing a polyester phase from the core-shell composite particles and incubating the resulting shells with the chemical species to be encapsulated. The chemical species may be a pharmaceutical composition. The incubated shells may be isolated and dried to form a powder of the chemical species encapsulated by the shells.

BRIEF DESCRIPTION OF THE DRAWING

The invention is described with reference to the several figures of the drawing, in which.

DETAILED DESCRIPTION OF THE INVENTION

Figure 1:
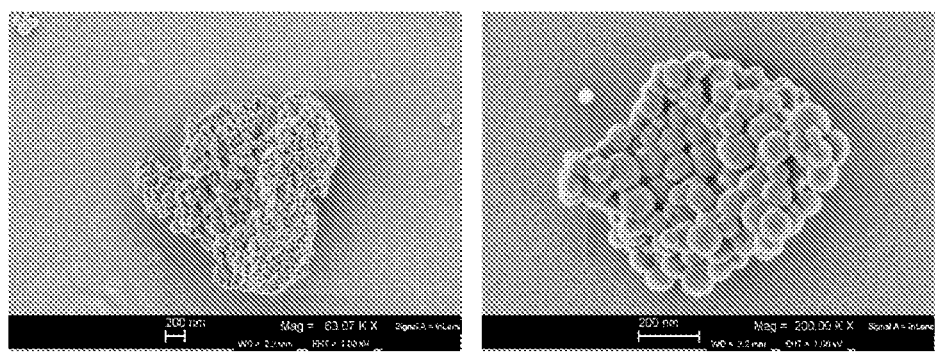
FIG. 1 is a series of scanning electron micrographs of core-shell composite particles according to an exemplary embodiment of the invention

Herein is described a process for preparing core-shell composite particles comprising: (i) providing a solution comprising one or more polyesters and up to 10 parts by mass per part of the total amount of polyester of a first ethylenically unsaturated silane compound having alkoxysilane groups in an organic solvent; (ii) adding sufficient base to the solution provided in step (i) to deprotonate acid groups on the polyester in solution; (iii) adding water to the solution obtained in step (ii) to form an emulsion; (iv) distilling at least a portion of the solvent and the base from the emulsion to bring the emulsion to a pH of from 5 to 7; (v) adding up to 30 parts by mass per part of the total amount of polyester of a second ethylenically unsaturated silane compound having alkoxysilane groups to the emulsion; (vi) radically polymerizing the ethylenically unsaturated silane compound to provide a dispersion of core-shell particles; and (vii) cross-linking the polymerized ethylenically unsaturated silane compound by hydrolyzing and condensing at least a portion of the alkoxysilane groups. The core shell composite particles are produced with at least 0.1 total parts of ethylenically unsaturated silane compound having alkoxysilane groups per part total amount of polyester.

In certain embodiments, one or more crystalline polyesters are used to prepare the core-shell composite particles. As used herein, the crystalline polyester refers to a polyester showing a clear endothermic peak corresponding to a melting transition rather than a stepwise change in heat flux or heat capacity as measured by differential scanning calorimetry (DSC). Alternatively or in addition, the core-shell composite particles are prepared from one or more amorphous polyesters. The amorphous polyester is differentiated from the crystalline polyester at least in part by not showing a clear endothermic peak corresponding to a melting transition during DSC. Mixtures of amorphous and crystalline polyesters may also be employed in any ratio. Preferably, the acid number of the polyester used in the core shell composite particles is at least 10. However, mixtures of polyesters may be employed in which the acid number of one polyester is less than 10 and the acid number of another polyester is greater than 10.

In one embodiment, a polymer latex is prepared from the polyester, for example, by phase inversion. The polyester is dissolved in an organic solvent. The solvent is preferably one that both solubilizes the polymer and exhibits at least some solubility in water. For example, the solubility of the organic solvent in water may be greater than 1 g in 100 mL of water. Exemplary solvents include alcohols, ketones, esters, ethers, chlorinated solvents, nitrogen containing solvents and mixtures of two or more solvents, for example, acetone, isopropyl alcohol, ethanol, methanol, methyl acetate, methyl ethyl ketone, tetrahydrofuran, cyclohexanone, ethyl acetate, N,N dimethylformamide, benzene, dimethylsulfoxide, acetonitrile, and mixtures of any of the foregoing solvents.

The polyester/solvent solution may include any suitable amount of polymer in solvent, for example, from about 10 wt. % to about 70 wt. %, from about 20 wt. % to about 60 wt. %, or about 30 wt % to about 50 wt % based on the total mass of polymer and solvent. The solvent may include a mixture of solvents, for example, 20 wt. % isopropyl alcohol in methylethyl ketone or ethyl acetate. Gentle heating, e.g., well below the boiling point of the solvent, may facilitate dissolution of the polymer.

The solution may also contain an optional first ethylenically unsaturated silane compound. In certain embodiments, ethylenically unsaturated silane compounds for use with the invention have the structure $R^4SiR'_m(OR'')_n$, wherein $R^4$ is either C2-C4 alkenyl or $R^3C(CH_2)(CO)OR^2-$, $R^3$ is either H or C1-C6 alkyl, $R^2$ is C3-C22 alkylene, and R' and R'' are independently C1-C6 alkyl, m is an integer of 0-2, and n is an integer of 1-3, wherein m+n=3. In a preferred embodiment, (trimethoxysilyl)propyl methacrylate is employed.

When the polymer-solvent solution includes a first ethylenically unsaturated silane compound, the ethylenically unsaturated silane compound may be present in the solution in an amount up to, e.g., less than or equal to, 10 parts per part of polyester (by mass), for example, from 0.1 to 9 parts per part of polyester, from 1 to 8 parts per part of polyester, from 2 to 7 parts per part of polyester, from 3 to 6 parts per part of polyester, from 4 to 5 parts per part of polyester, or from 5 to 8 parts per part of polyester. The mass ratio of polyester to the ethylenically unsaturated silane compound depends in part on the size of the polyester particles that are to be formed in the core, the desired thickness of the shell, and the desired particle size. If the amount of ethylenically unsaturated silane compound is too high, particles of the silane compound may form as a byproduct in addition to the core-shell composite particles.

A base is then added to deprotonate at least a portion of the acid groups on the polymer. Sufficient base should be added to deprotonate from 179-892 µmol acid groups/g polymer (equivalent of 10-50 mg KOH/g polymer), for example, from 200 to 850 µmol acid groups/g polymer, from 300 to 750 µmol acid groups/g polymer, from 400 to 650 µmol acid groups/g polymer, or from 500 to 600 µmol acid groups/g polymer. If a polymer has an acid number less than 10, it may be combined with a second polymer having a higher acid number to provide sufficient acid groups to deprotonate. Without being bound by any particular theory, it is believed that the deprotonated polymer acts as a surfactant to stabilize the emulsion described below. If an insufficient amount of acid groups are not deprotonated, the emulsion will not be stable. As the number of deprotonated acid groups increases, stable emulsions can be produced with smaller polymer droplets (higher surface area). If too many acid groups are deprotonated, the polymer will become soluble in the water used to produce the emulsion and a solution will be formed instead. The base should be soluble in the solvent used to dissolve the polymer and sufficiently volatile to be removed with the solvent via distillation of the emulsion described below. A non-limiting example of a suitable base is ammonium hydroxide.

Following addition of the base, sufficient water should be added to emulsify the polymer/solvent solution; excess water will merely dilute the dispersion. In some implementations, the water may be added in a weight ratio of water to solvent of from about 10:1 to about 3:1, for example, from about 4:1 to about 8:1, or from about 5:1 to about 7:1. Initially, the addition of water results in the production of a water-in-oil emulsion. Upon further addition of water, phase inversion takes place to form an oil-in-water emulsion. The pH of the emulsion may be from 7 to 10, for example, from 7.5-9.5 or from 8 to 9.

Following formation of the emulsion, the pH is reduced to neutralize the emulsion. Distillation to remove at least a portion of the solvent phase also removes at least a portion of the volatile base from the emulsion, lowering the pH to from 5 to 7, for example, from 6 to 7 or 6.5 to 7. The distillation temperature may be above (or below) the glass transition or melting point of the polymer in the emulsion. Following distillation, a second ethylenically unsaturated silane compound may be added to the emulsion. The second ethylenically unsaturated silane compound may have the same or a different composition as the first ethylenically unsaturated silane compound. Alternatively or in addition, two ethylenically unsaturated silane compounds, either of which may have the same composition as the first ethylenically unsaturated silane compound, may be added to the emulsion. In addition, either a non-radically polymerizable alkoxysilane compound, a vinyl and/or acrylic monomer, or both may be added to the emulsion as a comonomer along with the second ethylenically unsaturated silane compound. The total amount of second ethylenically unsaturated silane compound and any comonomers added to the emulsion can be up to 30:1 by mass with respect to the polyester, for example, from 0.1:1 to 19:1, from 1:1 to 18:1, from 2:1 to 17:1, from 3:1 to 16:1, from 4:1 to 15:1, from 5:1 to 14:1, from 6:1 to 13:1, from 7:1 to 12:1, from 8:1 to 10:1, or from 10:1 to 15:1. It is expected that a small portion of the alkoxysilane groups of the second ethylenically unsaturated silane compound hydrolyze prior to the radical polymerization described below. However, the extent of hydrolysis is limited as a result of the neutral pH of the emulsion.

Where a first ethylenically unsaturated silane compound is employed, the second ethylenically unsaturated silane compound is optional, and vice versa. One or more vinyl, acrylic, and/or alkoxysilane compound comonomers may be used even in the absence of the second ethylenically unsaturated silane compound. Nonetheless, the total amount of ethylenically unsaturated silane compound(s) should be at least 0.1 part by mass with respect to 1 part of polyester. Exemplary silane compounds include alkyl and aryl dimethoxy- and trimethoxysilanes, for example, methyl trimethoxysilane, phenyl trimethoxysilane or octyl trimethoxy silane, and the non-halogenated silane compounds listed as hydrophobizing agents below. Exemplary vinyl or acrylic monomers include styrene, methyl acrylate, benzyl methacrylate, propyl methacrylate, butyl methacrylate, ethyl acrylate, and methyl methacrylate. Other silane compounds and radically polymerizable monomers may also be used.

Following addition of the ethylenically unsaturated silane compound(s) and optional vinyl and/or acrylic co-monomers, the ethylenically unsaturated groups are polymerized. Because the emulsion is neutralized before the second silane compound is added, the condensation of the alkoxysilane groups is limited prior to radical polymerization. Polymerization may be initiated by exposure to UV radiation. Alternatively or in addition, a radical polymerization initiator may be added to the emulsion to initiate polymerization of the ethylenically unsaturated silane compound(s) to produce core-shell particles. Non-limiting examples of useful free radical initiators include azo-type initiators such as 2-2'-azobis(dimethylvaleronitrile), azobis(isobutyronitrile), azobis(cyclohexanenitrite), azobis(methylbutyronitrile), mixtures thereof, and the like, peroxide initiators such as benzoyl peroxide, lauroyl peroxide, methyl ethyl ketone peroxide, isopropyl peroxycarbonate, 2,5-dienethyl-2,5-bis (2-ethylhexanoylperoxy)hexane, di-tert-butyl peroxide, cumene hydroperoxide, dichlorobenzoyl peroxide, persulfate initiators such as potassium persulfate, ammonium persulfate, and mixtures thereof. An effective quantity of polymerization initiator is generally about 0.01 percent to about 10 percent by weight of the total amount of ethylenically unsaturated compounds in the emulsion. In a preferred embodiment, the polymerization initiator is azobis(isobutyronitrile) (AIBN). The polymerization of the ethylenically unsaturated compounds is typically carried out at a temperature of about 50° C. to about 100° C., for example, 60° C. to about 90° C. Polymerization of the ethylenically unsaturated silane compound and any radically polymerizable co-monomers results in formation of a shell about the polyester core. Preferably, the radical polymerization is substantially complete, leaving fewer than 5 molar percent of ethylenically saturated carbon in the shell with respect to the total carbon in the shell. Without being bound by any particular theory, it is believed that the roughness of the core-shell composite particle may be adjusted by adjusting the amount of initiator and/or the temperature of polymerization, with faster polymerization kinetics resulting in a smoother shell.

Following radical polymerization, alkoxysilane groups from the ethylenically unsaturated silane compound(s) and any additional silane comonomer(s) may be hydrolyzed. Silanols resulting from hydrolysis are condensed to crosslink the shell. For example, the pH of the emulsion may be increased to pH 7.5-10.5, for example, pH 8-10, by addition of ammonium hydroxide or another base, thereby causing hydrolysis and condensation of the alkoxysilane groups. Alternatively or in addition, hexamethyldisilazane, alone or in combination with an additional hydrophobizing silane or silazane compound, may be added to the emulsion to effect hydrolysis and condensation. When an additional hydrophobizing silane is added, addition of a water soluble alcohol such as isopropyl alcohol will facilitate dissolution of the hydrophobizing agent. Reacting the residual alkoxysilane (and hydrolyzed silanol groups) with each other or with hydrophobizing silanes or silazanes reduces the silanol concentration at the surface of the composite particle, increasing hydrophobicity. However, the reaction of the alkoxysilane groups may be incomplete, with 5-20 molar percent of silane groups remaining uncondensed. Without being bound by any particular theory, it is believed that the radical polymerization of the shell reduces the mobility of the hydrolyzed silanol groups, which become side chains of the polymer, making complete condensation more difficult. In contrast, if the emulsion was maintained at a more acidic or basic pH before addition of the ethylenically unsaturated silane compound(s) and optional additional silane compound(s), the hydrolyzed silanol groups would condense before radical polymerization, resulting in the formation of organosilica nodules comprising —$(R_1SiO_{3/2})$—, where $R_1$ is an organic group, closer in chemical and physical structure to sol-gel silica than to either a siloxane polymer or the polymer shell of the current core-shell particles. Nonetheless, some of the alkoxysilane groups may have already been hydrolyzed prior to the radical polymerization. Indeed, it is expected that a substantial portion of alkoxysilane groups on both the first and second ethylenically unsaturated silane compound will have been hydrolyzed already.

Crystalline polyesters for use as described herein can have any suitable weight average molecular weight. The crystalline polyester may have a weight average molecular weight of about 10,000 g/mol or more, for example, about 20,000 g/mol or more, about 24,000 g/mol or more, about 26,000 g/mol or more, about 28,000 g/mol or more, about 30,000 g/mol or more, about 40,000 g/mol or more, about 50,000 g/mol or more, about 55,000 g/mol or more, about 60,000 g/mol or more, or about 70,000 g/mol or more. Alternatively, or in addition, the crystalline polyester may have a weight average molecular weight of about 100,000 g/mol or less, for example, about 90,000 g/mol or less, about 80,000 g/mol or less, about 75,000 g/mol or less, about 70,000 g/mol or less, about 65,000 g/mol or less, about 60,000 g/mol or less, about 55,000 g/mol or less, about 50,000 g/mol or less, about 40,000 g/mol or less, or about 30,000 g/mol or less. Thus, the crystalline polyester may have a weight average molecular weight bounded by any two of the above endpoints. For example, the crystalline polymer may have a weight average molecular weight of about 10,000 g/mol to about 100,000 g/mol, e.g., about 20,000 g/mol to about 90,000 g/mol, about 30,000 g/mol to about 80,000 g/mol, about 40,000 g/mol to about 75,000 g/mol, about 50,000 g/mol to about 70,000 g/mol, about 55,000 g/mol to about 60,000 g/mol, about 10,000 g/mol to about 55,000 g/mol, about 20,000 g/mol to about 50,000 g/mol, or about 30,000 g/mol to about 40,000 g/mol.

The crystalline polyester can have any suitable acid number. The crystalline polyester may have an acid number of about 1 or more, for example, about 5 or more, about 10 or more, about 15 or more, about 20 or more, or about 25 or more. Alternatively, or in addition, the crystalline polyester may have an acid number of about 30 or less, for example, about 25 or less, about 20 or less, or about 15 or less. Thus, the crystalline polyester may have an acid number bounded by any two of the above endpoints. For example, the crystalline polymer may have an acid number of about 1 to about 30, e.g., about 1 to about 25, about 1 to about 20, about 1 to about 15, about 5 to about 30, about 5 to about 25, about 5 to about 20, or about 5 to about 15. As used herein, the acid number refers to the mass of potassium hydroxide used to neutralize 1 gram of the crystalline polyester.

Amorphous polyesters for use as described herein can have any suitable weight average molecular weight. The amorphous polyester may have a weight average molecular weight of about 10,000 g/mol or more, for example, about 12,000 g/mol or more, about 14,000 g/mol or more, about 16,000 g/mol or more, about 18,000 g/mol or more, about 20,000 g/mol or more, about 22,000 g/mol or more, about 24,000 g/mol or more, about 26,000 g/mol or more, about 28,000 g/mol or more, or about 20,000 g/mol or more. Alternatively, or in addition, the amorphous polyester may have a weight average molecular weight of about 50,000 g/mol or more, for example, about 48,000 g/mol or less, about 46,000 g/mol or less, about 44,000 g/mol or less, about 42,000 g/mol or less, about 40,000 g/mol or less, about 38,000 g/mol or less, about 36,000 g/mol or less, about 34,000 g/mol or less, about 32,000 g/mol or less, or about 30,000 g/mol or less. Thus, the amorphous polyester may have a weight average molecular weight bounded by any two of the above endpoints. For example, the amorphous polymer may have a weight average molecular weight of about 10,000 g/mol to about 50,000 g/mol, e.g., about 12,000 g/mol to about 50,000 g/mol, about 14,000 g/mol to about 50,000 g/mol, about 16,000 g/mol to about 50,000 g/mol, about 18,000 g/mol to about 50,000 g/mol, about 20,000 g/mol to about 50,000 g/mol, about 10,000 g/mol to about 48,000 g/mol, about 10,000 g/mol to about 46,000 g/mol, about 10,000 g/mol to about 44,000 g/mol, about 10,000 g/mol to about 42,000 g/mol, about 10,000 g/mol to about 40,000 g/mol, about 10,000 g/mol to about 38,000 g/mol, about 10,000 g/mol to about 36,000 g/mol, about 10,000 g/mol to about 34,000 g/mol, about 10,000 g/mol to about 32,000 g/mol, or about 10,000 g/mol to about 30,000 g/mol.

The amorphous polyester can have any suitable acid number. The amorphous polyester may have an acid number of about 5 or more, for example, about 10 or more, about 15 or more, about 20 or more, about 25 or more, or about 30 or more. Alternatively, or in addition, the amorphous polyester may have an acid number of about 50 or less, for example, about 45 or less, about 40 or less, about 35 or less, or about 30 or less. Thus, the amorphous polyester may have an acid number bounded by any two of the above endpoints. For example, the amorphous polymer may have an acid number of about 5 to about 50, e.g., about 5 to about 45, about 5 to about 40, about 10 to about 50, about 10 to about 45, about 10 to about 40, about 15 to about 50, about 15 to about 45, or about 15 to about 40. As used herein, the acid number refers to the mass of potassium hydroxide used to neutralize 1 gram of the amorphous polyester.

In certain embodiments, the core-shell composite particles are washed with a solvent. Without being bound by any particular theory, it is believed that the solvent treatment dissolves any free or surface-adsorbed polyester at the surface of the core-shell composite particles, e.g., exterior of the shell. Any suitable solvent may be used to wash or treat the core-shell composite particles. One of skill in the art will recognize that suitable solvents may vary with the composition of the crystalline and amorphous polymers used to make the core-shell composite particles. Blends of two or more solvents may also be used. Exemplary solvents include but are not limited to isopropyl alcohol, dimethyl formamide, methyl ethyl ketone, acetone, dichloromethane, and dimethylsulfoxide, and mixtures of these. For example, the core-shell particles may be briefly rinsed with solvent or may be incubated for thirty minutes to 1.5 hours in a large excess (e.g., at least 20× by weight, for example, from 25× to 35× by weight).

In certain embodiments, the core-shell composite particles are treated or reacted with a hydrophobizing agent. The composite particles may be surface treated before they are recovered from the aqueous media in which they were formed. For example, the techniques disclosed in U.S. Pat. Nos. 7,811,540, 8,202,502, 8,435,474, 8,455,165, 2008/0070146, 8,945,804, and 8,895,145, the contents of all of which are incorporated by reference, may be used to hydrophobize the core-shell composite particles provided herein. Alternatively, fluidized beds and other apparatus known to those of skill in the art may be used to treat the core-shell particles following drying.

The hydrophobizing moieties derived from the hydrophobizing agent may be bonded either covalently or non-covalently to the core-shell composite particles. In certain embodiments, the hydrophobizing agent can be a silicone fluid. Non-limiting examples of useful silicone fluids include polydimethylsiloxanes, polydiethylsiloxanes, phenylmethylsiloxane copolymers, fluoroalkylsiloxane copolymers, hydroxyl terminated siloxanes, diphenylsiloxane-dimethylsiloxane copolymers, phenylmethylsiloxane-dimethylsiloxane copolymers, phenylmethylsiloxane-diphenylsiloxane copolymers, methylhydrosiloxane-dimethylsiloxane copolymers, polyalkylene oxide modified silicones, cyclic polysiloxanes of the D3, D4, and D5 types, and the like.

In certain embodiments, the hydrophobizing agent comprises a hydrophobizing silane. For example, the hydrophobizing silane can be a compound of the formula: $R^3{}_{4-n}SiX_n$ wherein n is 1-3, each $R^3$ is independently selected from the group consisting of hydrogen, a $C_1$-$C_{18}$ alkyl group, a $C_3$-$C_{18}$ haloalkyl group, and a $C_6$-$C_{14}$ aromatic group, and each X is independently a $C_1$-$C_{18}$ alkoxy group or halo.

In certain embodiments, the hydrophobizing agent comprises a silazane. For example, the hydrophobizing agent can be hexamethyldisilazane, octamethyltrisilazane, a cyclic silazane, and the like. In certain preferred embodiments, the hydrophobizing agent comprises hexamethyldisilazane, octyltrimethoxysilane, or a combination thereof.

In certain embodiments, the hydrophobizing agent comprises a charge modifying agent such as one or more of those disclosed in U.S. Pat. No. 8,945,804, the contents of which are incorporated herein by reference. Exemplary charge modifying agents include, but are not limited to, agents having the formula: An-$Z_c$—$Y_b$—Ar(EW)$_a$, where Ar represents an aromatic group, EW represents an electron withdrawing group, Y represents a spacer group, Z represents an alkylene group, An represents an anchor group via which the charge modifying agent is attached to the surface, a is an integer from 1 to 5, b is 0 or 1, and c is 0 or 1. Specific charge modifying agents include, but are not limited to, 3-(2,4-dinitrophenylamino) propyltriethoxysilane (DNPS), 3,5-dinitrobenzamido-n-propyltriethoxysilane, 3-(triethoxysilyl-propyl)-p-nitrobenzamide (TESPNBA), pentafluorophenyltriethoxysilane (PFPTES), and 2-(4-chlorosulfonylphenyl)ethyltrimethoxysilane (CSPES).

Alternatively, or in addition, the dimethylsiloxane co-polymers disclosed in U.S. Pat. No. 8,895,145, the contents of which are incorporated herein by reference, may be used to treat the composite particles. Exemplary dimethylsiloxane co-polymers include co-polymers of the formula:

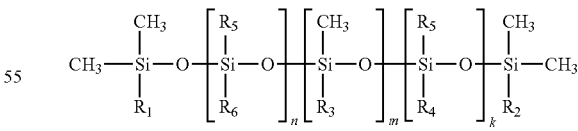

wherein $R_1$ is —H, —$CH_3$, $R_2$=—H, —$CH_3$, $R_3$=—$CH_3$, —$CH_2CH_3$, —$CH_2CH_2CH_3$, $CH_2Ar$, —$CH_2CH_2Ar$, —Ar, —$CH_2CH_2CF_3$, or —$CH_2CH_2$—$R_f$ with $R_f$ being a $C_1$ to $C_8$ perfluoroalkyl group, $R_4$ is —$CH_3$, —$CH_2CH_3$, —$CH_2CH_2CH_3$, —$CH_2CH_2CF_3$, or —$CH_2CH_2$—$R_f$ with $R_f$ being a $C_1$ to $C_8$ perfluoroalkyl group, $R_5$ is —$CH_3$, —$CH_2CH_3$, —$CH_2Ar$, —$CH_2CH_2Ar$, or —Ar, $R_6$ is —H, —OH, —$OCH_3$, or —$OCH_2CH_3$, Ar is unsubstituted phenyl or phenyl substituted with one or more methyl, halogen, ethyl, trifluoromethyl, pentafluoroethyl, or —CH$_2$CF$_3$ groups, n, m, and k are integer numbers, n≥1, m≥0, and k≥0, and wherein the co-polymer has a molecular weight from 208 to about 20,000.

The core-shell composite particles may be isolated from the reaction mixture used to prepare the particles. For example, the core-shell composite particles can be isolated by filtration, by centrifugation, or by spray-drying the reaction mixture used to prepare the particles. The core-shell composite particles can be provided in any suitable level of purity or dryness. In certain embodiments, the core-shell composite particles can be dried to provide a dry powder of core-shell composite particles. Suitable methods for drying the core-shell composite particles include, without limitation, heating, vacuum, air drying, and treating with a stream of dry gas, for example, nitrogen. Alternatively or in addition, the core-shell composite particles can be provided as a dispersion or suspension in any suitable carrier. For example, the carrier can comprise the solvent(s) and/or first or second ethylenically unsaturated silane compound used in the process to prepare the core-shell composite particles. In some embodiments, the solvent and/or first or second ethylenically unsaturated silane compound can be replaced with another liquid carrier or carriers by evaporation of the reaction mixture followed by addition of the liquid carrier. For example, the core-shell composite particles may be dispersed in water, with or without a water miscible co-solvent or surfactant.

The crystalline and amorphous polyesters are synthesized from an acid (dicarboxylic acid or tricarboxylic acid) and an alcohol (diol). Examples of suitable crystalline and amorphous polyesters can be found in U.S. Patent Application Publications US2011/0065034, 2011/0053078 A1, 2011/0086301 A1, 2011/0053078 A1, 2015/0125790 A1, 2015/0037729 A1, 2016/0002396 A1, 2017/0285502 A1, 2017/0285503 A1, and 2017/0212441 A1; U.S. Pat. No. 7,951,519; European patent application publications EP 2985303 A1, EP 2984118 A1, EP 2984119 A1, and EP 2833209 A1; Japanese patent application publication JP 2015059952; and Fukuri et al., *Journal of Imaging Science and Technology*, 2011, 55(1): 010509-010509-8, the contents of all of which are incorporated herein by reference. Alternatively or in addition, either or both of the crystalline and amorphous polyester may be a copolymer, for example, a copolymer of crystalline and amorphous polyesters with each other or with other polymers. Exemplary copolymers are discussed in JP2016061875, JP2016033648, JP2015169784, JP2015166808, US20150132690, JP2015055848, US20150072287, US20150072278, US20150056549, JP2015001720, JP2014232169, JP2014186231, JP2014074892, US20140099579, US20140080050, JP2014048576, JP2013140339, JP2013134489; JP2013130824, US20130157193, EP2605070, JP2013097321, JP2013015771, US20130017481, JP2012255957, JP2011132500, JP2010107673, JP2010060651, US0100047706, JP2009300848, US20080050669, JP2005275234, JP2005049489, JP2003270853; JP2003177574, JP2001222138, JP04330459, JP04250462, JP04250464, and JP02198455.

The acid can be a divalent aliphatic dicarboxylic acid, for example, a linear carboxylic acid or a divalent aromatic dicarboxylic acid. The aliphatic dicarboxylic acid can be saturated or unsaturated, and, when unsaturated, may contain one or more olefinic bonds. Non-limiting examples of suitable aliphatic and aromatic dicarboxylic acids include oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid, 1,18-octadecanedicarboxylic acid, maleic acid, fumaric acid, citraconic acid, itaconic acid, glutaconic acid, phthalic acid, isophthalic acid, terephthalic acid, succinic acid, adipic acid, sebacic acid, azelaic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, and isooctylsuccinic acid, lower alkyl esters thereof, and acid anhydrides thereof.

The acid also can be a trivalent or higher valent carboxylic acid, and the anhydrides and lower alkyl esters thereof. Non-limiting examples of suitable aliphatic and aromatic tricarboxylic acids and tetracarboxylic acids include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and EMPOL trimer acid, anhydrides thereof and lower alkyl esters thereof.

The alcohol may be an aliphatic diol, for example, linear aliphatic diols having 2 to 20, e.g., 2 to 14, carbon atoms in the main chain. and non-limiting examples thereof include ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,7-heptanediol, 1,8-octanediol, 1,9-nonanediol, 1,10-decanediol, 1,11-dodecanediol, 1,12-undecanediol, 1,13-tridecanediol, 1,14-tetradecanediol, 1,18-octadecanediol and 1,20-eicosanediol, 1,4-cyclohexanedimethanol, dipropylene glycol, polyethylene glycol, polypropylene glycol, polytetramethylene glycol, bisphenol A, hydrogenated bisphenol A, alkylene oxide adducts of bisphenol A, e.g., polyoxypropylene(2.2)2,2-bis(4-hydroxyphenyl)propane, polyoxypropylene(3.3)2,2-bis(4-hydroxyphenyl)propane, polyoxyethylene(2.0)2,2-bis(4-hydroxyphenyl)propane, polyoxypropylene(2.0)polyoxyethylene(2.0)2,2-bis(4-hydroxyphenyl)propane, and polyoxypropylene(6)2,2-bis(4-hydroxyphenyl)propane. Non-limiting examples of trihydric or higher hydric alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene.

Non-limiting examples of unsaturated diols include 2-butene-1,4-diol, 3-butene-1,6-diol, or 4-butene-1,8-diol.

Copolymers including ester linkages may also be employed. For example, products such as Petronauba C, Petrolite C-7500, and Petrolite C-8500 from Baker Hughes, which include oxygenated functional groups may be used to produce the composite particles provided herein. Alternatively or in addition, polyester/polyurethanes such as those sold under the Neocryl (Avecia, Inc.), Quilastic (Merquinsa), and Dispercoll (e.g. Dispercoll U54 polymer from Covestro), Emuldur (BASF), or Luphen (BASF) names or disclosed in U.S. Pat. No. 6,306,942 or US2017/212441, the contents of which are incorporated herein by reference, may also be employed.

The method for manufacturing the polyester resin, whether crystalline or amorphous, is not particularly limited, and the resin may be produced by a general polyester-polymerization method of reacting an acid component and an alcohol component, such as a direct polycondensation method or an ester exchange method. The method may be appropriately selected in accordance with the type of the monomers. The molar ratio of acid component to alcohol component (acid component/alcohol component) at reaction varies depending on the reaction conditions and can be any suitable value, typically close to 1/1. Production of the polyester resin may be carried out at a polymerization temperature of 180 to 230° C. The reaction may be carried out while removing the water and alcohol generated during the condensation and optionally reducing the pressure in the reaction system as necessary.

When the monomers do not dissolve or are not compatible with each other at the reaction temperature, a high-boiling solvent may be added as a dissolution assistant to dissolve the monomers. The high-boiling assistant solvent may be distilled away from the reaction mixture during the polycondensation reaction. When there is a monomer with poor compatibility in the copolymerization reaction, the monomer with poor compatibility may be first condensed with either the acid or alcohol that is to be polycondensed with the monomer having poor compatibility, and then the condensate may be further subjected to polycondensation with major components.

Catalysts that are usable in the production of the polyester resin include, for example, alkali metal compounds such as those of sodium or lithium; alkaline earth metal compounds such as those of magnesium or calcium; metal compounds such as those of zinc, manganese, antimony, titanium, tin, zirconium, or germanium; and phosphorous acid compounds, phosphoric acid compounds and amine compounds. Specific examples thereof include sodium acetate, sodium carbonate, lithium acetate, lithium carbonate, calcium acetate, calcium stearate, manganese acetate, zinc acetate, zinc stearate, zinc naphthenate, zinc chloride, manganese acetate, manganese naphthenate, titanium tetraethoxide, titanium tetrapropoxide, titanium tetraisopropoxide, titanium tetrabutoxide, antimony trioxide, triphenyl antimony, tributyl antimony, tin formate, tin oxalate, tetraphenyl tin, dibutyltin dichloride, dibutyltin oxide, diphenyltin oxide, zirconium tetrabutoxide, zirconium naphthenate, zirconyl carbonate, zirconyl acetate, zirconyl stearate, zirconyl octylate, germanium oxide, triphenyl phosphite, tris(2,4-di-t-butylphenyl) phosphite, ethyltriphenyl phosphonium bromide, triethylamine, and triphenylamine.

Typically, at least a portion of the core-shell composite particle has a melting point of less than 200° C., for example, from 25 to 150° C. As discussed herein in connection with the crystalline polyester, DSC of a crystalline polyester shows a clear endothermic peak (rather than a stepwise change). The observation of a clear endothermic peak in an endothermic amount in DSC of the core-shell composite particle indicates the presence of a crystalline phase in the core-shell composite particle resulting from the presence of the crystalline polyester in the core-shell composite particle.

In other embodiments, the invention provides a composite particle comprising a polyester core comprising at least one of a crystalline polyester and an amorphous polyester and a shell formed from a radically polymerized ethylenically unsaturated silane compound. The shell comprises a polymer or copolymer of one or more ethylenically unsaturated silane compounds. Preferably, less than 25 mol %, for example fewer than 20%, fewer than 15%, more preferably fewer than 10%, most preferably fewer than 5% of the carbon in the shell is in ethylenically unsaturated groups as evaluated by $^{13}$C DPMAS (direct polarization magic angle spinning) NMR (nuclear magnetic resonance) spectroscopy. For example, fewer than 1 mol % of the carbon in the shell is part of an ethylenically unsaturated group. Alternatively or in addition, a proportion of T0 and T1 groups as a fraction of total T groups is from 5 to 20%, for example, from 10% to 15%, as measured by $^{29}$Si DPMAS NMR spectroscopy. In an organosilicate compound, T0 groups have the structure —CSi(OX)$_3$, where the groups X need not all be the same but may not have silicon bonded to the oxygen atom in the group OX. T1 groups have the structure —CSi(OX)$_2$(OSi—), T2 groups have the structure —CSi(OX)(OSi—)(OSi—), and T3 groups have the structure —CSi(OSi—)(OSi—)(OSi—).

In some embodiments, the amorphous polyester encapsulates at least a portion of the crystalline polyester. In other embodiments, the amorphous polyester exists in separate and discrete regions or domains of the composite particle. The crystalline polyester, amorphous polyester, ethylenically unsaturated silane compound and any comonomers (either or both of radically polymerizable and silane compounds) can be as described herein in connection with the process for producing the core-shell composite particles. In some embodiments, the surface of the composite particle has been reacted or treated with a hydrophobizing agent. The hydrophobizing agent can be as described herein in connection with the process for the core-shell composite particles.

In certain embodiments, the composite particle has a volume-median diameter ($d_{50}$) of about 50 nm to about 1000 nm, for example, about 100 nm to about 900 nm, about 200 nm to about 800 nm, about 300 nm to about 700 nm, about 400 nm to about 600 nm, or about 100 nm or 250 nm to about 500 nm as measured by disc centrifuge or dynamic light scattering. The core-shell composite particles may be spherical or may have a deflated spherical or biconcave disc shape. Alternatively or in addition, the shell may have voids or gaps or otherwise not cover 100% of the surface of the core. The proportion of polyester may be increased without changing the thickness of the shell derived from the ethylenically unsaturated silane compound by increasing the particle diameter.

In certain embodiments, at least a portion of the composite particle has a melting point of about 25° C. or more, for example, about 30° C. or more, about 35° C. or more, about 40° C. or more, about 45° C. or more, about 50° C. or more, about 55° C. or more, about 60° C. or more, about 65° C. or more, about 70° C. or more, about 75° C. or more, about 80° C. or more, about 85° C. or more, about 90° C. or more, about 95° C. or more, or about 100° C. or more. Alternatively, or in addition, at least a portion of the composite particle has a melting point of about 200° C. or less, for example, about 195° C. or less, about 190° C. or less, about 185° C. or less, about 180° C. or less, about 175° C. or less, about 170° C. or less, about 165° C. or less, about 160° C. or less, about 155° C. or less, about 150° C. or less, about 145° C. or less, about 140° C. or less, about 135° C. or less, about 130° C. or less, about 125° C. or less, about 120° C. or less, about 115° C. or less, or about 110° C. or less. Thus, at least a portion of the composite particle may have a melting point bounded by any two of the above endpoints. For example, at least a portion of the composite particle has a melting point of about 25° C. to about 200° C., about 30° C. to about 200° C., about 35° C. to about 200° C., about 40° C. to about 200° C., about 45° C. to about 200° C., about 50° C. to about 200° C., about 55° C. to about 200° C., about 60° C. to about 195° C., about 60° C. to about 190° C., about 70° C. to about 185° C., about 55° C. to about 180° C., about 75° C. to about 175° C., about 55° C. to about 170° C., about 55°

C. to about 165° C. about 80° C. to about 160° C. about 85° C. to about 155° C. or about 55° C. to about 150° C. The melting point, which can be determined using differential scanning calorimetry, indicates the presence of at least one crystalline phase in the composite particle.

The invention also provides a toner comprising toner particles and the inventive core-shell composite particles. The core-shell composite particles may be combined with toner particles to form the toner. Conventional toners can be prepared by a number of known methods, such as admixing and heating a resin, pigment particles, optional charge enhancing additives and other additives in conventional melt extrusion devices and related equipment. Conventional equipment for dry blending of powders may be used for mixing or blending the carbon black particles with the resin. Other methods include spray drying and the like. Compounding of the pigment and other ingredients with the resin is generally followed by mechanical attrition and classification to provide toner particles having a desired particle size and particle size distribution. Chemical toners, also known as chemically prepared toners, are produced in a liquid phase; the resin particles are generally formed in the presence of the colorant. For example, a process has been developed in which polymer latex is combined with aqueous pigment dispersion and agglomerated using a coagulant to form polymer particles. Another process involves the aqueous suspension polymerization of a dispersion of pigment in at least one monomer. Also, a pigment/polyester resin dispersion has been prepared and combined with water, followed by evaporation of the solvent.

The core-shell composite particles may be combined with toner for use as an external additive by dry blending the toner with the core-shell composite particles using a Henschel or other appropriate mixer. Alternatively, a dispersion of the core-shell composite particles may be combined with toner particles by a wet blending method such as that disclosed in WO2014/153355. For example, toner may be sonicated with a dispersion of the composite particles until a well-mixed dispersion is obtained. The toner particles with core-shell particles disposed or distributed about their surfaces may then be recovered from the dispersion, for example, by vortexing and drying or by other methods of recovering particles from dispersion.

The core-shell particles may provide a variety of benefits to toner formulations. The use of the core-shell particles as external additives provides additional polyester at the surface of the toner, allowing less polyester to be used in the toner particles themselves. Core-shell composite particles may melt, allowing toner particles to become glued or fused together without the necessity of completely melting the far bulkier toner particle, thereby allowing a lower fusing temperature for the toner. The core-shell particle additives can also be used in a pulverized conventional toner to lower fusing temperature because the additive delivers crystalline polyester to the surface. Such particles would be easier to clean because they would be irregularly shaped and have a rough surface. The core-shell particles can also be used to encapsulate waxes and deliver them to the surface of conventional pulverized toners where they can enable rapid blooming of wax on the toner surface under application of heat, resulting in reducing the friction between paper and fuser roll and thereby avoiding paper jam and hot offset issues.

In addition, the core-shell composite particles may be used inside toner particles. The particles can deliver crystalline polyester to toner, thereby lowering fusing temperatures, while avoiding compatibility issues resulting from direct mixtures of crystalline and amorphous polyesters. Alternatively or in addition, the core-shell particles may be used to encapsulate waxes within the toner particle.

The core-shell composite particles may be used in ink-jet inks. Such particles are generally not hydrophobized, as the inks are typically aqueous. The particles may be used to deliver polyester as part of the ink formulation. The core-shell particles may be used to encapsulate polymers that would otherwise form deposits on the resistor in an inkjet head. The thickness and level of crosslinking in the shell may be optimized to maintain the mechanical integrity of the particle in an ink reservoir but allow the particle to break during thermally induced or piezoelectric jetting processes. The polymer, along with the printed ink, can be heated with a hot roller or IR lamp to melt and release the polymer. Upon cooling, the polymer will harden to form a film or durable coating on the printed image.

Alternatively or in addition, the core-shell particles may be incorporated into a coating composition and/or used as a coating for a recording medium. For example, hydrophilic core-shell particles may be used in combination with or may partially or completely replace the silica particles in the coating composition disclosed in U.S. Pat. No. 6,861,112, the contents of which are incorporated herein by reference. During the printing process, the recording medium, having a coating including core-shell composite particles, is heated, for example, with a heated roller or an infrared lamp. The heat will melt and release the polymer in the core-shell particles. Upon cooling, the polymer will harden into a film or durable coating.

The core shell composite particles described herein may also provide benefits in other applications where, as for toner, free-flow of powders or smoothness in melted materials is desirable. For example, the core shell particles may be used as a flow aid in powders for selective laser sintering. The melting or glass transition temperature of the core may be close to that of the polymer powder, e.g., polyamide or polyurethane, to provide more uniform melting performance during 3D printing. The use of core-shell composite particles according to embodiments of the invention may also result in a smoother surface texture for the final part.

Alternatively or in addition, the core shell composite particles may be adapted to carry pharmaceuticals or other chemical compounds. For example, the polyester core may be remove using appropriate solvents or by heating the core-shell particles to decompose and remove the polyester. Any method known to those of skill in the art to load chemical compounds onto silica particles may be used to entrap pharmaceutical or other compositions onto the shell remaining after removal of the polyester. For example, the shells derived from ethylenically unsaturated silane compounds may be incubated with a desired pharmaceutical compound in an appropriate solution, rinsed to remove excess, and then dried to produce particles loaded with the pharmaceutical. In some embodiments, the desired chemical compound may be covalently attached to the hollow shells provided herein.

EXAMPLES

The following examples further illustrate the invention but, of course, should not be construed as in any way limiting its scope.

Materials: All solvents were purchased from Sigma-Aldrich and used as received. 3-(trimethoxysilyl)propyl methacrylate (MPS), vinyl trimethoxysilane (VTMS), hexamethyldisilazane (HMDZ), and octyltrimethoxysilane (OTMS)

were purchased from Gelest Inc. Dispercoll U54 crystalline polymer was obtained from Covestro AG and dried at elevated temperature in an oven. The dried, hot polyester has a gel like morphology and was quenched in cold water to ease mass measurements in the procedures below. Amorphous polyester (APE), Finetone T6694, was purchased from Reichhold Co. and used as received.

Example 1

This example demonstrates a synthesis of core-shell composite particles, in accordance with an embodiment of the invention.

Particle formation (Step #1). 10 g of an amorphous polyester, 10 g of a crystalline polyester, 20 g of MPS, 10 g of methyl ethyl ketone (MEK), and 5 g of isopropanol (IPA) are combined in 500 mL 4-neck round-bottom flask equipped with an overhead stirrer, condenser, thermocouple and a heating mantle. To dissolve the polymers, the temperature of the reaction mixture is raised to 65° C. over about 20 min until the solution becomes transparent. To ensure that the polymers are completely dissolved, the reaction mixture is stirred for another 30 min. To this solution, 1 g of 5 M aqueous ammonium hydroxide is added and allowed to react for ~10 min. Then, 100 g of deionized water is added at a rate of 1.67 mL/min using a syringe pump until an oil-in-water emulsion is formed.

Neutralization (Step #2). To the stirred dispersion prepared in Step #1, DI water is added to bring the solids concentration to about 10 wt %. The temperature is raised to 85° C. and maintained for 2 h with the reaction mixture under nitrogen. The MEK, alcohol, and ammonium hydroxide are removed by distillation using a Dean Stark head until the pH is about 6.5 to 7.

Polymerization (Step #3). The stirred dispersion is brought to room temperature, and the agitation rate is set to 380 rpm, following which 20 g of vinyltrimethoxysilane is added using a syringe pump. The temperature is brought to 80° C., and 0.2 g of free-radical initiator (AIBN) are added. Free radical polymerization is allowed to proceed at 80° C. for one hour, following which 5 M ammonium hydroxide is added to bring the pH to 9.0-9.5. The reaction is allowed to proceed for an additional hour.

Surface treatment (Step #4). The temperature of the reaction mixture is decreased to 75° C., and 2 g of HMDZ and 2 g of OTMS are added to the reaction. The surface treatment reaction is allowed to continue at 75° C. for 8 h.

Particle isolation and drying (Step #5). The final dispersion is cooled to room temperature, filtered under vacuum, and dried at room temperature under a stream of air.

Example 2

This example demonstrates a synthesis of core-shell composite particles, in accordance with an embodiment of the invention.

Particle formation (Step #1). 32 g of a first crystalline polyester having an acid number less than 10, 8 g of a second crystalline polyester having an acid number greater than 10, 10 g of MPS, 20 g of methyl ethyl ketone (MEK), and 10 g of isopropanol (IPA) were combined in 500 mL 4-neck round-bottom flask equipped with an overhead stirrer, condenser, thermocouple and a heating mantle. To dissolve the polymers, the temperature of the reaction mixture was raised to 65° C. over about 20 min until the solution became transparent. To ensure that the polymers are completely dissolved, the reaction mixture was stirred for another 30 min. To this solution, 2 g of 5 M aqueous ammonium hydroxide was added to deprotonate at least 179 µmol acid groups/g polymer and allowed to react for about 20 min. Then, 100 g of deionized water was added at a rate of 3.3 mL/min using a syringe pump until an oil-in-water emulsion is formed. The final dispersion was cooled to room temperature, and samples were collected for particle size distribution, $^{13}C$ DPMAS NMR. and TEM measurements. The NMR results showed that the methoxysilane groups from the MPS added in this step had condensed but the methacrylic side chains were still highly mobile and likely located at the surface of the polyester.

Neutralization (Step #2). To the stirred dispersion prepared in Step #1, DI water was added to bring the solids concentration to about 10 wt %. The temperature was raised to 85° C. and maintained for 2 h with the reaction mixture under nitrogen. The MEK, alcohol, and ammonium hydroxide were removed by distillation using a Dean Stark head until the pH is about 6.5-7.

Polymerization (Step #3) The reaction mixture containing 44 g solids was cooled to room temperature and diluted to a solids content of 12 wt %. The agitation rate was set to 380 rpm and the mixture was charged with 22 g MPS. Following 30 minutes of stirring, a second 22 g aliquot of MPS was added and the mixture allowed to stir for an additional 30 min. The temperature was set to 80° C. and the agitation rate to 200 rpm, and 0.55 g of AIBN was added to the reaction mixture. Free radical polymerization was allowed to proceed at 80° C. for one hour, following which 5 M ammonium hydroxide was added to bring the pH to 9.0. The reaction was allowed to proceed for an additional hour.

Samples were collected for NMR, and $^{29}Si$ DPMAS NMR showed strong T0 and T1 peaks, indicating a large number of un-condensed silanol or methoxysilane groups. $^{13}C$ DPMAS NMR showed no double bonds remaining from the MPS, indicating that free radical polymerization was very effective. The treatment at pH 9 promoted the condensation of silanol groups, and the magnitude of the T0 and T1 peaks (−40-−44 ppm and −48-−52 ppm respectively) in the NMR of the final product was significantly less than after Step #3.

Surface treatment (Step #4). The temperature of the reaction mixture was decreased to 75° C., and 10 g of HMDZ and 10 g of OTMS in 50 mL isopropyl alcohol were added to the reaction. The surface treatment reaction was allowed to continue at 75° C. for 10 h.

Particle isolation and drying (Step #5). The final dispersion was cooled to room temperature, filtered under vacuum, rinsed with additional IPA, and dried at room temperature under vacuum with a slow stream of nitrogen.

Washing (Step #6). To 15 g of dry product was added 188 mL each of dichloromethane and MEK in a 0.5 L round bottom flask. The mixture was allowed to sit for one hour after which the solid phase was separated by centrifugation and allowed to dry at room temperature.

Chemical toner samples were formulated with 2 wt % of the core-shell composite particles and sufficient black polyester chemical toner (particle size 8-12 µm, supplied by Sinonar Inc.) to make an 80 g sample. The toner and additive were mixed in an IKA M20 Universal Mill (IKA Works, Inc., Wilmington N.C.) for 45 s. The mill was operated in pulse mode (three cycles of 15 s mixer on and 15 s mixer off) to keep the toner from being heated above its glass transition temperature. The core-shell composite particles were well dispersed about the surface of the toner particles, with minimal agglomeration.

Example 3

This example details the production of core shell composite particles containing an amorphous polyester (Finetone T6694 polyester).

Synthesis of particle core: 20 g of Finetone T6694, 5 g of MPS, 10 g of MEK and 5 g of isopropyl alcohol (IPA) were combined in a round-bottom flask. The flask contents were agitated and the temperature increased to 65° C. When all the polymers were dissolved, 1 g of an aqueous solution of 5 M $NH_4OH$ was added and the mixture allowed to stir for about 20 min, after which 100 mL of deionized water was added at a rate of 3.33 mL/min until an oil in water emulsion was formed. The pH of this emulsion was 9.

Synthesis of particle shell: The reaction mixture was diluted with deionized water to ~10 wt % solids. A Dean-Stark distillation head was put on the flask, the temperature was set to 85° C., and a slow nitrogen flow through the headspace was turned on. MEK, IPA and ammonium hydroxide were removed by distillation. At the end of the distillation, the pH was 6.4 and concentration of solids was about 15 wt %.

The reaction mixture, containing 23 g of solids, was cooled to room temperature and diluted with deionized water to 10 wt %. The agitation rate was set to 380 rpm and 17 g of MPS was added. After 30 min, an additional 17 g of MPS was added, and the mixture was allowed to stir for another 30 min after which the temperature was set to 80° C., the agitation rate was set to 200 rpm, and 0.34 g of AIBN free radical initiator was added. Free-radical polymerization was allowed to proceed at 80° C. for 1 hour.

Surface treatment and drying: The temperature was reduced to 75° C., and a mixture of 4 g OTMS and 4 g of HMDZ in 20 mL of IPA was added and allowed to react for 10 h. The final mixture was cooled to room temperature, filtered, rinsed with IPA and dried at room temperature on the filter under vacuum in a slow stream of nitrogen. SEM micrographs of these particles are shown in FIG. 1. Particle size was measured by dynamic light scattering using a Nanotrac™ 252 instrument ($d10=69$ nm, $d50=106$ nm, $d90=147$ nm, $d95=161$ nm).

The polyester content of the core-shell composite particles was determined by thermogravimetric analysis (TGA) using a TGA Q500 apparatus from TA Instruments. The sample temperature was raised from 25° C. to 850° C. under nitrogen at a rate of 10° C./min and held at a constant temperature of 850° C. for 5 min, after which the nitrogen atmosphere was switched to air and the sample was held at 850° C. for an additional 20 min. Any weight loss up through 20 min was interpreted as water or residual solvent loss. The total weight loss after the temperature ramp and air burn was determined from 20 min to about 107 min. The weight percent of sample burned was calculated after correction for weight loss due to evaporation of water/residual solvent. The measured weight loss was 79.6 wt %, in close agreement to the theoretical percentage (80.4 wt %) of polyester used to produce the core shell composite particles of the Example.

Example 4

This example demonstrates the synthesis of core shell particles containing Dispercoll U54 crystalline polyester polyurethane.

Synthesis of polymer core: 20 g of the dried Dispercoll U54 polyester polyurethane, 10 g of MPS, 10 g of MEK and 5 g of IPA were combined in a round-bottom flask. The flask contents were agitated and the temperature increased to 65° C. When all the polymers had dissolved, 1.1 g of aqueous solution of 5 M $NH_4OH$ was added and the mixture was allowed to stir for about 20 min, after which 100 mL of deionized water was added at a rate of 1.67 mL/min rate until an oil-in-water emulsion was formed. The pH of this emulsion was 9.4.

Synthesis of particle shell: The reaction mixture was diluted with deionized water to about 10 wt % solids. A Dean-Stark distillation head was put on the flask, the temperature was set to 85° C., and a slow nitrogen flow through the headspace was turned on. MEK, IPA, and ammonium hydroxide were removed by distillation. At the end of the distillation, the pH was 6.9 and the concentration of solids was about 11.5 wt %.

The reaction mixture containing 27.5 g of solids was cooled to room temperature and diluted with deionized water to 10 wt %. The agitation rate was set to 380 rpm, and 17 g of MPS was added. After 30 min, an additional 13 g of MPS was added, and the mixture was allowed to stir for another 30 min, after which the temperature was set to 80° C., the agitation rate to 200 rpm, and 0.4 g of AIBN free-radical initiator was added. Free-radical polymerization was allowed to proceed at 80° C. for 2 h Surface treatment and drying: The temperature was reduced to 75° C., and a mixture of 3 g OTMS and 3 g of HMDZ in 25 mL of IPA was added and allowed to react for 10 h. The final mixture was cooled to room temperature, filtered, rinsed with IPA and dried at a room temperature on the filter under vacuum in a slow stream of nitrogen.

Figure 2:
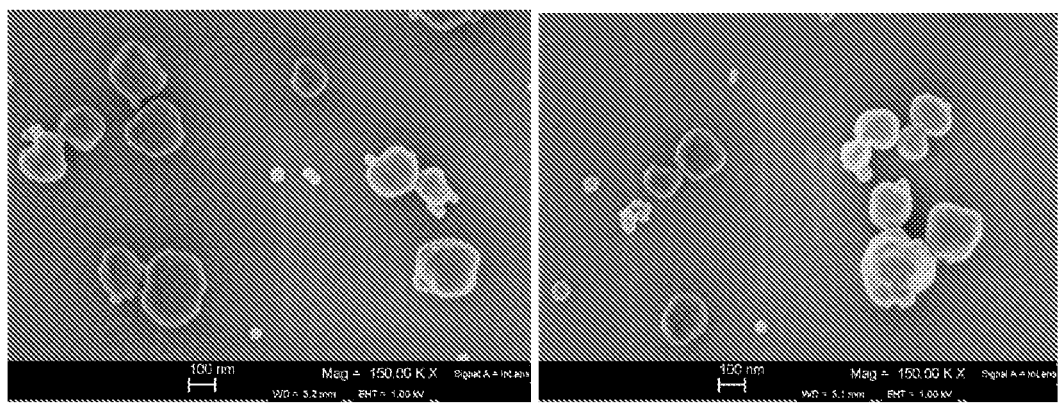
FIG. 2 is a series of scanning electron micrographs of core-shell composite particles according to an exemplary embodiment of the invention.

Washing: The particles were incubated in MEK (10% solids) for two hours at 55° C., after which the solid phase was separated by centrifugation and allowed to dry at room temperature. Particle size was measured as described above: $d10=157$ nm; $d50=295$ nm; $d90=452$ nm, $d95=517$ nm. SEM micrographs are shown in FIG. 2. TGA was performed as described above. The actual weight loss, 80.1 wt %, is in close agreement with the theoretical value, 80.2 wt %, based on the relative proportions of polyester and other components used to produce the core shell composite particles.

Differential scanning calorimetry (DSC) was conducted in a nitrogen atmosphere. The sample was heated from room temperature to 100° C. at 20° C./min rate, held for 1 min at 100° C. and then cooled to −50° C./min at 20° C./min rate and held at −50° C. for 1 min. The heating-cooling cycle was repeated 3 times.

Figure 3A:
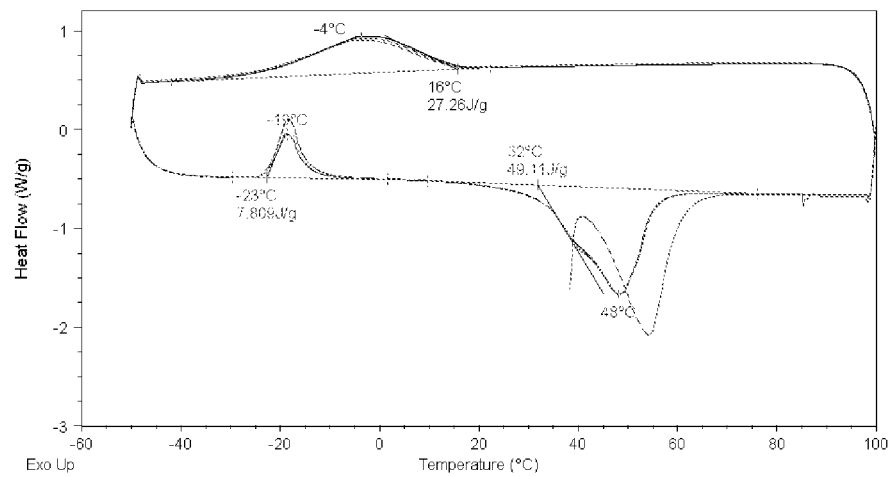
FIG. 3A is a differential scanning calorimetry profile of a crystalline polyester.
Figure 3B:
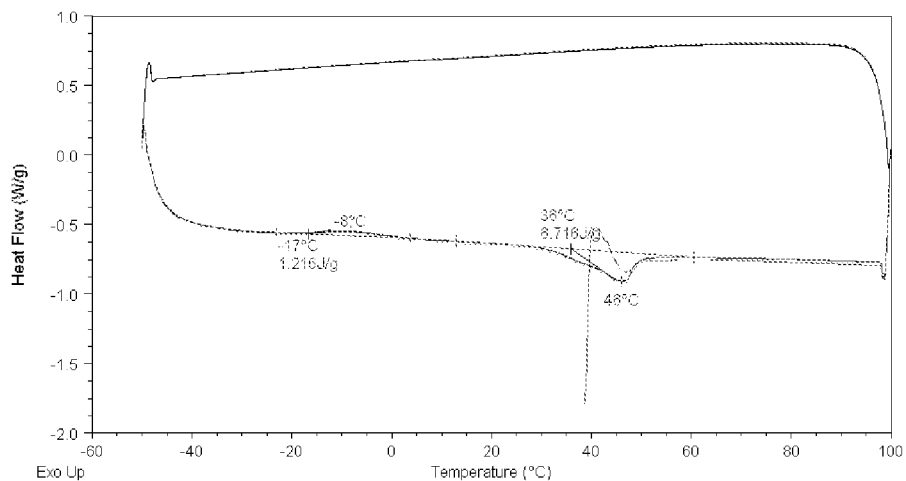
FIG. 3B is a differential scanning calorimetry profile of core-shell composite particles according to an exemplary embodiment of the invention and incorporating the crystalline polyester whose DSC profile is shown in FIG. 3A.

The DSC scan of neat Dispercoll U54 polymer shows three peaks (FIG. 3A): a broad exothermal peak due to crystallization during cooling (onset at +16° C.), and one exothermal peak and one endothermal peak during heating which correspond to crystallization and melting (onsets at −23° C. and +49° C., respectively). Crystallization during heating is not unusual and results from relatively fast cooling, which hinders sample crystallization. FIG. 3B shows a DSC scan for the core-shell composite particles of this Example. The figure shows crystallization and melting of Dispercoll U54 polymer during heating. Any exothermal peak due to polymer crystallization during cooling is probably very broad and could not be identified. Overall, polymer crystallization and melting behavior is probably affected by the fact that the polymer is confined in 50-500 nm capsules with thermally insulating walls.

Example 5

This example details the production of core shell composite particles containing crystalline polyester, PE4-8, synthesized by CM-Tec. Inc. (1 Innovation Way, Suite 100, Newark, Del. 19711) using 1,10-dodecanedioic acid and 1,10-decane diol.

|  | PE-4-8 |
|---|---|
| Mw | 111000 |
| Mn | 62600 |
| Acid number | 14 |
| Tm (C.) | 82 |

Synthesis of particle core: 10 g of PE4-8, 2.5 g of MPS, 5 g of MEK and 3 g of isopropyl alcohol (IPA) were combined in a round-bottom flask. The flask contents were agitated and the temperature increased to 65° C. When all the polymers were dissolved, 0.7 g of an aqueous solution of 6M $NH_4OH$ was added and the mixture allowed to stir for about 20 min, after which 100 mL of deionized water was added at a rate of 3.33 mL/min until an oil in water emulsion was formed. The pH of this emulsion was 9.9.

Synthesis of particle shell: The reaction mixture was diluted with deionized water to ~10 wt % solids. A Dean-Stark distillation head was put on the flask, the temperature was set to 85° C., and a slow nitrogen flow through the headspace was turned on. MEK, IPA and ammonium hydroxide were removed by distillation. At the end of the distillation, the pH was 6.8 and concentration of solids was about 15 wt %.

The reaction mixture, containing 12 g of solids, was cooled to room temperature and diluted with deionized water to 10 wt %. The agitation rate was set to 300 rpm and 6 g of MPS was added. After 30 min, an additional 5 g of MPS was added, and the mixture was allowed to stir for another 30 min after which the temperature was set to 80° C., the agitation rate was set to 160 rpm, and 0.11 g of AIBN free radical initiator was added. Free-radical polymerization was allowed to proceed at 80° C. for 1 hour.

Surface treatment and drying: The temperature was reduced to 75° C., and a mixture of 2 g OTMS and 2 g of HMDZ in 10 ml of IPA was added and allowed to react for 10 h. The final mixture was cooled to room temperature, filtered, rinsed with IPA and dried at room temperature on the filter under vacuum in a slow stream of nitrogen. Particle size distribution was measured by dynamic light scattering using a Nanotrac™ 252 particle size instrument before the dispersion was filtered and dried (d10=149 nm, d50=271 nm, d90=424 nm, d95=482 nm).

Figure 4A:
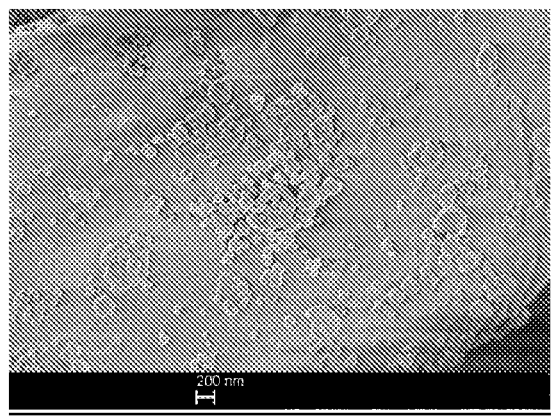
FIGS. 4A and 4B are scanning electron micrographs of a model toner having core-shell composite particles dispersed on the toner surface.
Figure 4B:
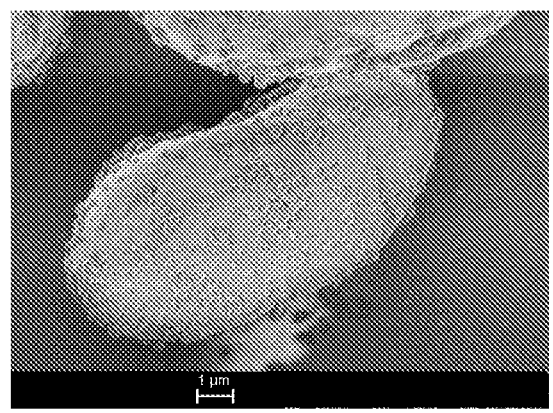

The dry product was washed with MEK (~10 wt % of composite particles dispersion in MEK at 55 C was agitated for ~1.5 h), dried and mixed at 2 wt % loading with a model polyester toner as described above. FIG. 4 shows SEM images of composite particles on toner surface.

Example 6

This example details the production of core shell composite particles containing a commercial amorphous polyester, Finetone T-382ES manufactured by Reichhold.

|  | T-382ES polymer |
|---|---|
| Mw | 13,900 |
| Mn | 4760 |
| Acid number | 21 |
| Tg (C.) | 56 |

Synthesis of particle core: 20 g of T-382ES polymer, 5 g of MPS, 10 g of MEK and 5 g of isopropyl alcohol (IPA) were combined in a round-bottom flask. The flask contents were agitated and the temperature increased to 65° C. When all the polymers were dissolved, 1.3 g of an aqueous solution of 6M $NH_4OH$ was added and the mixture allowed to stir for about 20 min, after which 100 mL of deionized water was added at a rate of 3.33 mL/min until an oil in water emulsion was formed. The pH of this emulsion was 9.5.

Synthesis of particle shell: The reaction mixture was diluted with deionized water to ~10 wt % solids. A Dean-Stark distillation head was put on the flask, the temperature was set to 85° C., and a slow nitrogen flow through the headspace was turned on. MEK, IPA and ammonium hydroxide were removed by distillation. At the end of the distillation, the pH was 6.4 and concentration of solids was about 15 wt %.

The reaction mixture, containing 23 g of solids, was cooled to room temperature and diluted with deionized water to 10 wt %. The agitation rate was set to 380 rpm and 15 g of MPS was added. After 30 min, an additional 10 g of MPS was added, and the mixture was allowed to stir for another 30 min after which the temperature was set to 80° C., the agitation rate was set to 160 rpm, and 0.12 g of AIBN free radical initiator was added. Free-radical polymerization was allowed to proceed at 80° C. for 1 hour.

Surface treatment and drying: The temperature was reduced to 75° C., and a mixture of 5 g OTMS and 5 g of HMDZ in 10 ml of IPA was added and allowed to react for 10 h. The final mixture was cooled to room temperature, filtered, rinsed with IPA and dried at room temperature on the filter under vacuum in a slow stream of nitrogen. Particle size distribution was measured by dynamic light scattering using a Nanotrac™ 252 instrument before the dispersion was filtered and dried (d10=106 nm, d50=214 nm, d90=353 nm, d95=401 nm).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A process for preparing core-shell composite particles comprising:
   (i) providing a solution comprising one or more polyesters and up to 10 parts by mass, per part of the total amount of polyester, of a first ethylenically unsaturated silane compound having alkoxysilane groups in an organic solvent;
   (ii) adding sufficient base to the solution provided in step (i) to deprotonate acid groups on the polyester in solution;
   (iii) adding water to the solution obtained in step (ii) to form an emulsion;
   (iv) distilling at least a portion of the solvent and the base from the emulsion to bring the emulsion to a pH of from 5 to 7;
   (v) adding up to 30 parts by mass, per part of the total amount of polyester, of a second ethylenically unsaturated silane compound having alkoxysilane groups to the emulsion;
   (vi) radically polymerizing the first and second ethylenically unsaturated silane compounds to form a shell of the polymerized silane compounds about the polyesters to provide a dispersion of core-shell particles; and
   (vii) cross-linking the polymerized ethylenically unsaturated silane compound by hydrolyzing and condensing at least a portion of the alkoxysilane groups,
   wherein the core shell composite particles are produced with at least 0.1 total parts of ethylenically unsaturated silane compound having alkoxysilane groups per part of the total amount of polyester.

2. The process of claim 1, further comprising surface-treating the core shell particles with a hydrophobizing agent.

3. The process of claim 2, wherein the hydrophobizing agent comprises a silane and/or a silazane and wherein cross-linking and hydrophobizing are performed simultaneously.

4. The process of claim 1, wherein the first and second ethylenically unsaturated silane compounds have the same composition.

5. The process of claim 1, wherein a portion of alkoxysilane groups of the first ethylenically unsaturated silane compound are hydrolyzed before radically polymerizing.

6. The process of claim 1, further comprising adding a vinyl monomer, an acrylic monomer, or an alkoxysilane to the emulsion in step (v).

7. The process of claim 1, further comprising isolating the core-shell particles.

8. The process of claim 1, wherein the first and second ethylenically unsaturated silane compounds independently have a structure $R^4SiR'_m(OR'')_n$, wherein $R^4$ is either C2-C4 alkenyl or $R^3C(CH_2)(CO)OR^2-$, $R^3$ is either H or C1-C6 alkyl, $R^2$ is C3-C22 alkylene, and R' and R'' are independently C1-C6 alkyl, m is an integer of 0-2, and n is an integer of 1-3, wherein m+n=3.

9. A composite particle produced by the process of claim 1.

10. A toner composition comprising toner particles and the composite particle produced by the process of claim 1.

* * * * *